United States Patent [19]

Ryynänen

[11] Patent Number: 4,976,875
[45] Date of Patent: Dec. 11, 1990

[54] METHOD OF AND APPARATUS FOR SEPARATING A MEDIUM IN DIFFERENT COMPONENTS BY MEANS OF GRAVITY

[75] Inventor: Seppo I. Ryynänen, Kuopio, Finland

[73] Assignee: Lisop Oy, Kerava, Finland

[21] Appl. No.: 341,313

[22] Filed: Apr. 19, 1989

Related U.S. Application Data

[63] Continuation of Ser. No. 104,052, Oct. 28, 1987, abandoned.

[30] Foreign Application Priority Data

Feb. 12, 1986 [FI] Finland .................................. 860637

[51] Int. Cl.⁵ .................. B01D 17/032; B01D 17/038; B01D 17/025; B04C 7/00
[52] U.S. Cl. ............................... 210/788; 210/512.2; 210/801; 210/802; 210/803; 210/534; 209/208; 209/211
[58] Field of Search .................. 210/512.1, 512.2, 787, 210/788, 534, 801, 802, 803; 209/211, 144, 173, 208, 209; 55/459

[56] References Cited

U.S. PATENT DOCUMENTS

| | | | |
|---|---|---|---|
| 2,088,294 | 7/1937 | Geiger | 210/512.1 |
| 2,701,056 | 2/1955 | Morton | 209/144 |
| 3,084,798 | 4/1963 | Lau | 209/211 |
| 3,258,123 | 6/1966 | Fontaine | 210/519 |
| 3,948,771 | 4/1976 | Bielefeldt | 210/512.2 |
| 3,962,084 | 6/1976 | Nussbaum | 210/512.1 |
| 3,965,013 | 6/1976 | Jackson | 210/534 |
| 4,001,121 | 1/1977 | Bielefeldt | 55/461 |
| 4,205,965 | 6/1980 | Bielefeldt | 55/459.1 |
| 4,263,027 | 4/1981 | Varnas | 55/346 |
| 4,297,221 | 10/1981 | Moll | 210/512.2 |
| 4,375,365 | 3/1983 | Müller | 210/512.2 |
| 4,389,307 | 6/1983 | Boadway | 210/512.2 |
| 4,517,091 | 5/1985 | Yamanaka | 210/512.1 |
| 4,702,846 | 10/1987 | Ryynaner | 210/512.2 |
| 4,816,156 | 3/1989 | Brombach | 209/211 |
| 4,820,427 | 4/1989 | Ryyamanen | 209/211 |

FOREIGN PATENT DOCUMENTS

| | | | |
|---|---|---|---|
| 159016 | 9/1954 | Australia | 210/512.1 |
| 0162650 | 5/1985 | European Pat. Off. . | |
| 2160415 | 7/1973 | Fed. Rep. of Germany . | |
| 2206318 | 8/1973 | Fed. Rep. of Germany . | |
| 64058 | 10/1983 | Finland . | |
| 64746 | 1/1984 | Finland . | |
| 65920 | 8/1984 | Finland . | |
| 67665 | 5/1985 | Finland . | |
| 69766 | 5/1986 | Finland . | |
| 2082941 | 8/1981 | United Kingdom | 210/512.1 |
| 2108409 | 5/1983 | United Kingdom | 209/211 |
| 2113575 | 8/1983 | United Kingdom | 209/211 |
| 2148744 | 6/1985 | United Kingdom | 210/512.1 |

Primary Examiner—David L. Lacey
Assistant Examiner—Thomas M. Lithgow
Attorney, Agent, or Firm—Weingarten, Schurgin, Gagnebin & Hayes

[57] ABSTRACT

A method of and an apparatus for separating a liquid medium in different components by gravity in a manner that a medium to be separated is set in slow rotating motion (2) with the axis of rotation substantially vertical, so that the heavier component concentrates in the bottom section of a slow-moving vortex and the lighter component concentrates in the top section of a slow-moving vortex (2). For a more pronounced separation activity and simpler equipment, two or more slow-moving vortexes (2) are contacted with each other in horizontal direction. The outer sections of various settling basins (1) are in contact with each other by way of a gate or channel (40). Various sub-basins (1) can be connected in series or in parallel.

14 Claims, 3 Drawing Sheets

METHOD OF AND APPARATUS FOR SEPARATING A MEDIUM IN DIFFERENT COMPONENTS BY MEANS OF GRAVITY

This application is a continuation of application Ser. No. 07/104,052, filed Oct. 28, 1987 (now abandoned).

This invention relates to a method of and apparatus for separating a liquid medium in different components by means of gravity in a manner that a medium to be separated is set in slow rotating motion with the axis of rotation substantially vertical, so that the heavier component concentrates in the bottom section of a slow vortex and the lighter component concentrates in the top section of a slow vortex.

The term "a liquid medium", as used in this specification, refers to various fluids, mixtures thereof as well as various compositions of liquids and solid particles and also compositions of liquids and bubbles. The term "heavy component" refers to that portion of a compound which, by the action of gravity, has a tendency to descend with respect to the rest of the composition. Accordingly, "light component" has a tendency to rise in the composition as gravity pulls the rest of the composition downwards.

Prior known are gravity separators, wherein a liquid medium to be separated is set in slow rotating motion. These are disclosed e.g. in U.S. Pat. Nos. 2,088,294, 3,965,013 and 3,258,123, DE Patent Specification No. 2 034 794 as well as in GB Patent Specifications Nos. 2 082 941 and 2 148 744. In these prior known gravity-operated separators, a slow rotating motion is produced in a settling basin in order to obtain a so-called tea-cup phenomenon. There, a material settled on the bottom gathers along the bottom near the centre of rotation the same way the tails in a conventional tea cup concentrate in the centre of the bottom when tea is swirled in a cup. The only purpose of such slow rotating motion is to gather the particles in one spot. Separation is achieved by gravity, not at all by the slight centrifugal force of a slow vortex. The rotational flow is kept slow so as not to create turbulence near the bottom, which would disturb the descent down to the bottom achieved by gravity. A high velocity motion would also have a tendency to re-blend the particles that have already been separated onto the bottom.

A drawback in the prior known separators is the inefficiency of a tea-cup phenomenon in large units, as the heavy component does not concentrate in the bottom centre the way it is desired. On the other hand, if this teacup phenomenon is intensified in the prior known equipment by slightly increasing the speed of rotation, the disturbing turbulence is drastically increased. In the prior known equipment, due to the long diameters of the basins, it is often necessary to employ thick layers of liquid, the settling distance of particles down to the bottom increasing accordingly. This leads to a poorer separation result and the time required for settling becomes unreasonably long. Another drawback of the prior art equipment is bulkiness and a complicated and expensive construction. Due to their bulkiness, the prior art apparatus cannot often be located in cramped spaces. In the prior art equipment, the separation is effected in a single step and, thus, a portion of the heavy component accidentally entrapped in the light components can no longer be separated and added in the heavy component. Due to the great diameter, inclination of the bottom or the floor in the prior art equipment often remains slight, since the vertical space demand required by a steep funnel-shaped floor is great. The use of just slightly inclined funnels readily leads to the concentration of heavy component on a basin floor as a deposit, from which it may be re-blended in the flow as well as cause other trouble.

An object of this invention is to reduce the above drawbacks and in a method of the invention this is achieved so that two or more slow-moving vortexes are contacted with each other in horizontal direction.

The equipment intended for carrying out the method of this invention is set out in the accompanying claims.

The invention can be applied to a variety of purposes of separating liquid mediums by utilizing gravity. One important application is the separation of solids particles from liquids in various processes. These include e.g. the separation of sand from waste water, recovery of minerals and various utilities as well as sorting out particles according to grain size and shape.

The invention will now be described in more detail with reference made to the accompanying drawings, in which FIG. 1 shows an array of settling basins of the invention, the outer sections of successive basins being linked to each other.

The principal object of this invention is to make settling basins more effective and to simplify their construction. In small units the tea-cup phenomenon, i.e. a flow at the bottom towards the centre, is more effective than in large-diameter units, when the flow rate is equal. With the prior art equipment, designing a plurality of small units leads to a complicated and expensive construction. Instead, with the solution of this invention, it is possible to eliminate a number of walls and to avoid pipe connections between various units. Thus, the equipment according to the invention is much more economical. The use of a plurality of small-diameter settling basins also makes it possible to further incline the bottom, so the settling material does not stick to it very easily.

In an array of settling basins of the invention, the separation proceeds in several steps, whereby heavy component is removed from light component again and again. This improves possibilities of producing a highly pure light component. By using an array of settling basins, the flowing distance can be made quite long and, thus, even the poorly descending particles have more time to reach contact with the bottom. An underflow, occurring in each settling basin the same way as the tea-cup phenomenon, tends to bring the particles near the bottom at several stages, so the separation probability of even poorly settling particles becomes quite good. It is just the multiplication of separation probabilities which results in high degrees of separation.

With the solution of the invention, it is possible to control the intensity of a tea-cup phenomenon in various units and to have different materials separated in them. In some units, a turbulence can be adjusted to be quite powerful e.g. for washing coarse matter clean of fine matter.

Settling basins according to the invention can be disposed in a rectangular formation, so they can be readily located e.g. in a room space unlike the traditional large-diameter circular basins. In addition, it is possible to use a plurality of different arrays, as dictated by the available spaces. An array of settling basins of the invention can, if desired, be disposed as a section of a flow channel in a manner that the channel again proceeds normally downstream of said array. Therefore, neither very much space nor expensive pipe systems are needed.

The accompanying figures depict by way of an example a few embodiments of the invention and illustrate the practical operation of the invention. In reality, a great number of practical embodiments can be found for the invention. The designs and dimensions for the equipment of the invention are selected to suit any given application. The selection can be made on the basis of experimental research and theoretical studies.

Figure 1:
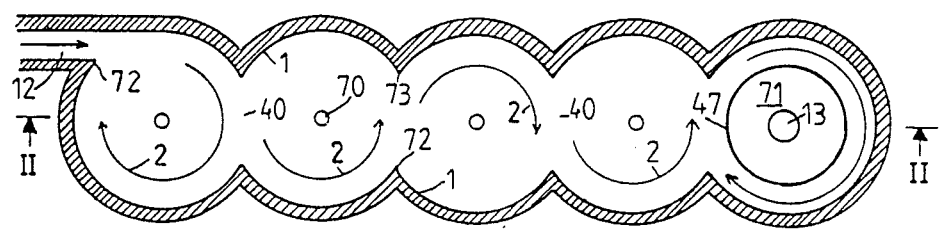

Designations of the components shown in the figures are as follows 1. wall of a settling basin
2. general travelling direction of a slow-moving vortex
12. a tangential inlet duct
13. light-component outlet
39. a flow divider for separating different vortexes
40. a gate or flow channel
47. an overflow weir
49. vortex centre axis
50. deflection fin
62. undercurrent towards the centre of a basin or so-called tea-cup phenomenon
64. level of a liquid medium
65. heavy component collection funnel
66. flow barrier plate
68. bottom of a settling basin
70. heavy component outlet
71. horizontal plate
72. trailing edge
73. collision edge FIG. 1 shows an array of settling basins 1, wherein the successive basins are connected to each other by way of a gate 40. Some of the outer fringe of a slow-moving vortex 2 of a preceding basin proceeds into the outer section of the next settling basin, where said slow-moving vortex 2 continues. In this case, the slow-moving vortexes of successive basins bear against each other at gate 40. In the contact zone, both slow-moving vortexes 2 in the same direction. The array shown in the figure comprises five successive settling basins. The general flowing direction is in this figure from left to right. The supply is effected through a tangential inlet duct 12, whose height in this case extends from bottom to top of the apparatus. A high inlet duct facilitates a high capacity. The heaviest particles tend to settle down already in the first settling basin on the left in the figure. Lighter particles are carried within the flow into the next basin, wherein gravity continues to collect particles in the lower section of the basin. The same action is repeated in the following basins. As the flow proceeds slowly from the first to the last basin in an array, gravity concentrates heavy component in the lower basin sections and light component in the top sections. The discharge of light component occurs in the case of this figure only from the last basin at the surface along an outlet 13. The light component discharges over an overflow weir 47. In the preceding basins of this array, heavy component is discharged from the bottom along outlets 70 in a sufficient amount. Said outlet channels 70 are adjusted by means of the opening size, a valve or by a counterpressure, so that light component is not unnecessarily entrapped in the heavy component. The first four units of the array are in this case a kind of preseparators with not very much flow discharged, but the amount of heavy component is reduced and settled towards the bottom. In the apparatus shown in FIG. 1, the settling basins are circular but, regarding the operation of such apparatus, it is also possible to use basin units of other shapes, e.g. elliptical, polygonal as well as different arched shapes. The collection of heavy and light component can be done from the geometric centre of a basin or from some off-centre spot. Especially in the first settling basins, it preferred to employ an eccentric disposition, so that eccentricity serves to provide room a main flow by-passing the basin unit. If desired, the trailing edges can be extended with vertical plates for separating the flows on different sides from each other. By means of these deflection fins, said gate 40 can also be reduced into a narrow flow channel between settling basins. The edges can be rounded. Especially collision edges 73 can be designed as rounded. When using sharp collision edges, it is possible to create an oscillatory motion in settling basins as the flow periodically passes on different sides of the edge. This reciprocating oscillatory motion is preferred for keeping the deposit gathered on the bottom in motion and for carrying it gradually to its point of collection.

Figure 2:
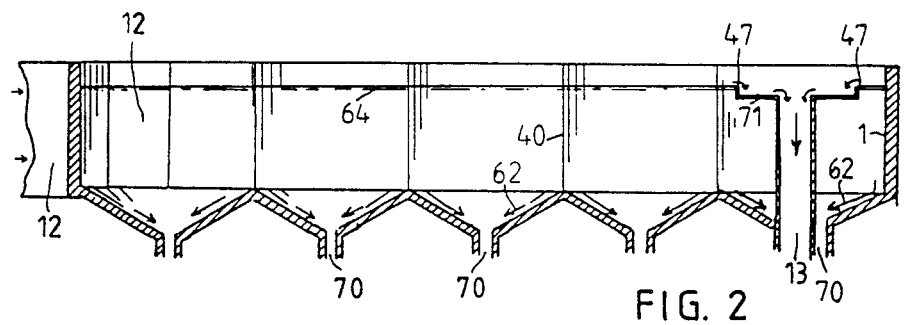
FIG. 2 is a section along a line II—II in FIG. 1.

FIG. 2 shows one possible section along a line II—II in FIG. 1. A high tangential inlet 12 has the effect that the inlet flow rate is low which means that there is only a little need for kinetic energy. As the successive basins 1 are by way of gates 40 in direct contact with each other, there will be no resistances of flow therebetween. The level 64 of a liquid medium is nearly horizontal in various basin units 1, 1. The original kinetic energy present in the supply can be utilized in the entire array. Thus, the energy demand is very little. In each settling basin occurs thin-layered flow 62 along the bottom towards the centre. In this thin layer of flow, the settling distance to the bottom is very short and, thus, the heavy component can be readily separated. As the same phenomenon repeats itself in a plurality of successive basins 1, the effect is intensified. In the case of FIG. 2, the light component discharges as an overflow 47 from the last basin. Below the overflow is a horizontal plate 71 for preventing the formation of a free vortex and its air core. Other ways of discharging the light component can also be used. Similar light component outlets may be provided in several basins and even in all settling basins 1. Heavy component can be passed via channels 70 to a common heavy component collection tank, if so desired, and the pressure level of this tank can be controlled by means of its own overflow. The proportion of flow rates between heavy component and light component can thus be controlled e.g. by adjusting the relative heights of the overflows of heavy and light component. If desired, the apparatus can also be made pressurized with a pressurized gas layer above liquid level 64 below a tight cover.

Figure 3:
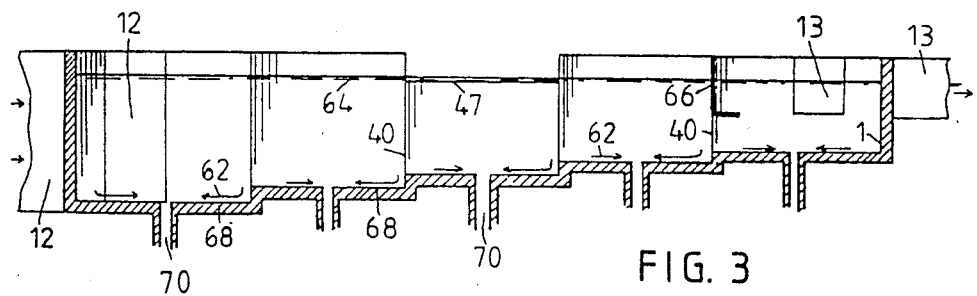
FIG. 3 shows an alternative section along a line II—II in FIG. 1.

FIG. 3 shows one alternative section along a line II—II. In this case, the basin bottoms are staggered in vertical direction. The staggered steps prevent a direct flow near the bottom from the forward end of an array towards its trailing end. The bottom layer containing a heavy component tends to remain below the steps. As the liquid layer keeps getting lower towards the trailing end, the separation of a heavy component becomes easier as the settling distance becomes shorter. Staggering can also be provided by using gently sloping designs without sharp-edged steps. Staggering can also be used for increasing the height of inlet duct 12 so as to reduce the inlet rate. Staggering can also be provided so that the thickness of a liquid layer increases from the forward to the trailing end of an array. This takes the heavy and the light component further and further away from each other. Staggering can also be much more pronounced than that shown in the figure. FIG. 3 shows also on principle a possibility of shutting off a part of gate 40 by means of a barrier plate 66. A flow barrier plate is in this case positioned in the top section to stop a direct flow to a tangential outlet 13 from the surface. A flow barrier plate can also be positioned to stop the passage of floating objects and particles to said light component outlet 13. The flow barrier plate 66 may be provided, in addition to the vertical member, also with horizontal members, leading e.g. to an L-shaped cross-section. Such a horizontal member prevents the formation of a turbulence created when by-passing a sharp vertical edge. Below said tangential light component outlet 13 occuring near the surface, there may be provided a horizontal plate for separating the bottom layers of liquid from the discharge flow. An effect similar to that obtained by staggering can be achieved by positioning near the bottom some vertical flow barrier plates 66, whose height is selected as appropriate. Light component can be discharged at various stages of the array of settling basins by using overflows 47 over the outer shoulder. They can be provided at the middle section of an array as in FIG. 3 or at the end of an array. By discharging light component little by little, the vertical flows can be made as slow as possible, whereby an upwards-directed flow does not pick up heavy component from the bottom and carry it along.

Figure 4:
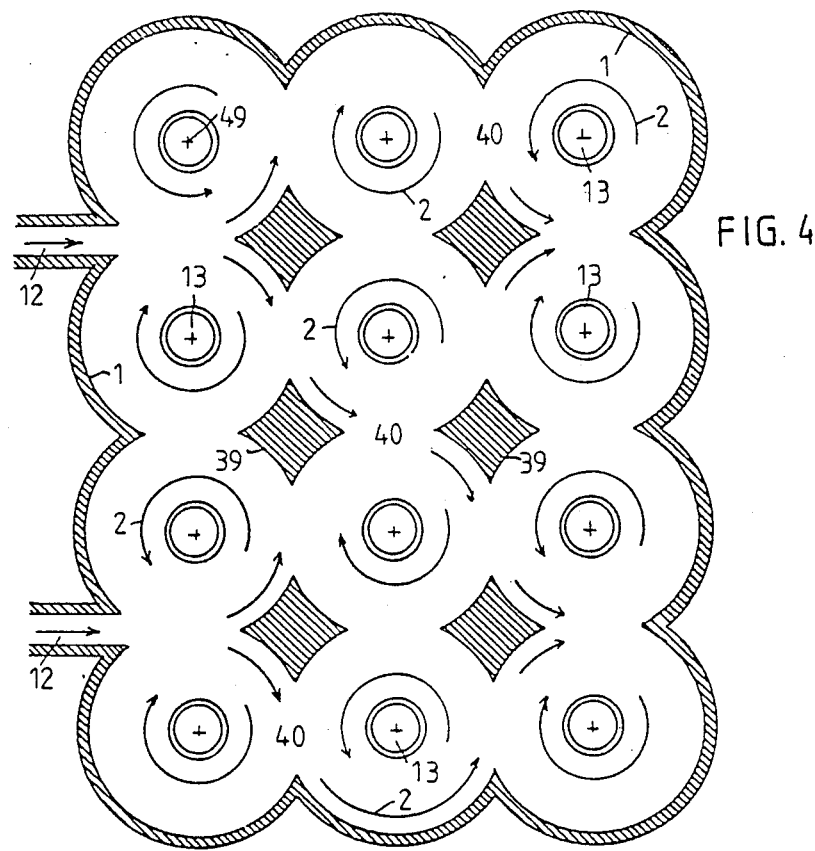
FIG. 4 shows a system of settling basins, wherein the outer sections of successive and parallel basins are linked to each other.

In FIG. 4, parallel and successive settling basins 1 are in contact with each other through gates 40. The settling basins make up a system of basins or pools with only minor flow dividers 39 between various basins. Thus, The required amount of building material is relatively little as compared to the equal number of completely separate basins. Such flow dividers 39 can also be of light construction and even hollow, if desired. If necessary, they can also be used as overflows 47 for the discharge of light component. Flow dividers 39 can, if desired, be mounted as separate units on the common bottom or floor of basins 1, 1. A hollow flow divider 39 can be allowed to build hydraulic pressure inside, so the structure can be made very light indeed as a result of the counter-pressure. In the case shown in FIG. 4, an oscillatory action can be made effective if flow dividers 39 are fitted with sharp collision edges. In FIG. 4, the light component outlet is shown the same way as in FIG. 2, but from all basin units 1. By applying the solution of FIG. 4, it is possible to combine the high capacity of a large-sized basin and the effective tea-cup phenomenon 62 found in small-sized basins.

Figure 5:
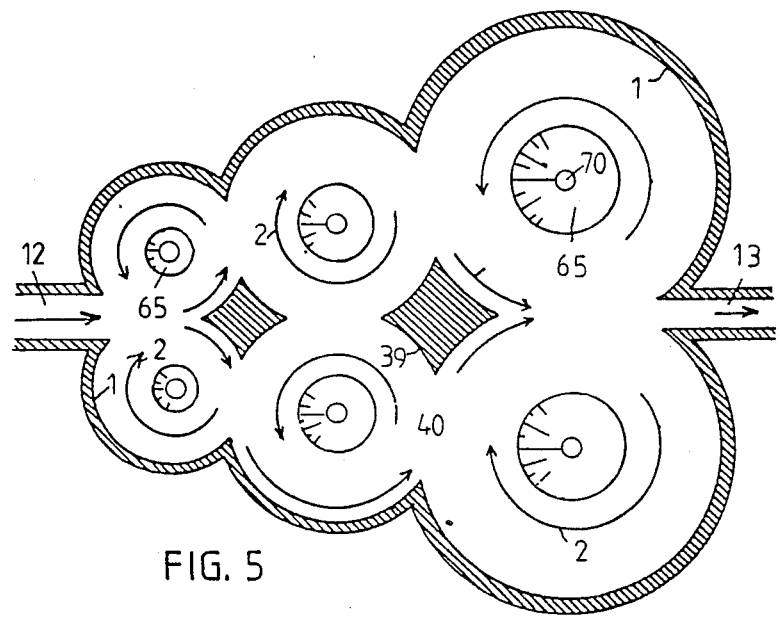
FIG. 5 shows a system of settling basins of the invention with a varying basin size.

FIG. 5 shows one solution, wherein the size of settling basins 1 is varying. At the outset of array 1, 1, the smaller diameter produces a stronger underflow 62 than what occurs in the larger basins towards the end. Thus, the heaviest particles, settled on the bottom at the outset of an array, are effectively gathered in their point of collection, but the quiet flow at the trailing end facilitates the separation of even slowly settling particles. In the case shown in FIG. 5, the separator is, in a way, part of a flow channel extending from inlet 12 to outlet 13. If desired, a settling separator can be designed without heavy component collection systems 70, in which case the heavy component just settles on the bottom of basins 1, wherefrom it is periodically removed e.g. by digging or sucking with separate devices. The size of settling basins in an array can also be gradually diminishing.

Figure 6:
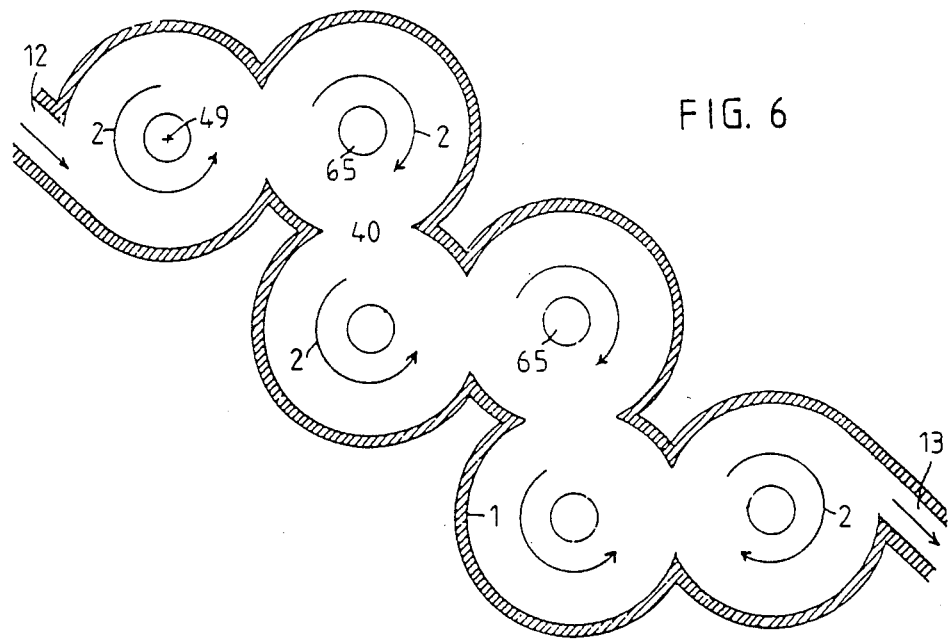
FIG. 6 shows an array of settling basins of the invention, wherein the bain centres make out a zigzag pattern.

FIG. 6 shows a solution in which basins 1 are disposed in a zigzag-pattern. A flow passing through the apparatus from inlet 12 to outlet 13 is forced to travel a distance as long as possible, which means that there is a long time available for settling. In most basins 1, the main flow turns more than 180° leading to an intensified tea-cup phenomenon 62 in the turning area.

Figure 7:
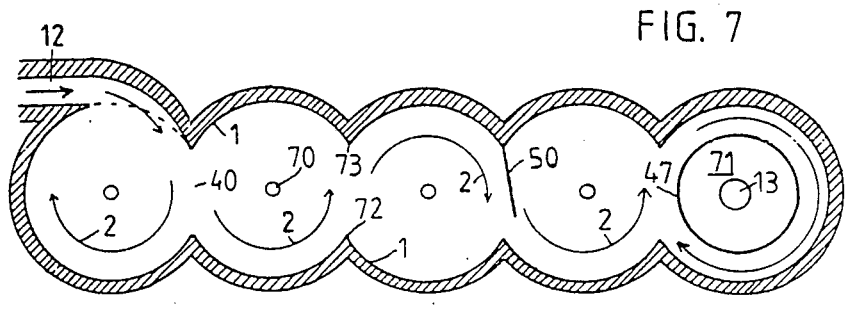
FIG. 7 shows an array of settling basins provided with a flow-deflection fin.

FIG. 7 depicts a solution in which a gate 40 is provided with a deflection fin 50 for increasing the tangential direction of flow. In this figure, an inlet 12 is positioned outside the radius of a first basin unit tangentially. Thereafter, because of the outer wall, the inlet flow is forced to work its way closer to the centre of first basin 1. This intensifies the effect of tea-cup phenomenon 62. This type of arrangement is preferred particularly in the lower section of inlet 12 near the bottom.

I claim:

1. A method of separating to a desired degree a liquid medium into heavy and light components by means of gravity, comprising the steps of:

rotating the liquid medium in a first vertical rotational pattern having a combination of vertical height and angular velocity sufficient to allow gravity to separate some of the heavy component from the light component by settling some of the heavy component out of the liquid medium, wherein said angular velocity is so slow that centrifugal effects on separation of the heavy and light components are negligible and turbulence is not generated in the liquid medium sufficient to cause mixing of any heavy component settled out of the liquid medium with said light component, yet sufficiently fast to collect any heavy component settled out of the liquid medium at the bottom center of the rotational pattern;

rotating the liquid medium in at least one additional like rotational pattern until the desired degree of separation of said heavy and light components is achieved, wherein each of said first and additional like rotational patterns contacts at least one other of said first and additional like rotational patterns in the horizontal direction;

removing said heavy component settled out of the liquid medium from the bottom center of each of said first and additional like rotational patterns; and removing said light components from the top of at least one of said first and additional like rotational patterns.

2. The method of claim 1, wherein the liquid medium is tangentially guided into an area to form said first rotational pattern and wherein some of the liquid medium in each of said first and additional like rotational patterns travels from the outer periphery of one of said first and additional like rotational patterns to the outer periphery of at least one other of said first and additional like rotational patterns.

3. The method of claim 2, wherein said first and additional like rotational patterns are formed in a parallel array.

4. The method of claim 2, wherein said first and additional like rotational patterns are formed in a sequential array.

5. An apparatus for separating a liquid medium into heavy and light components by means of gravity wherein centrifugal effects on separation of the heavy and light components are negligible, comprising:
- a first basin for causing gravity separation of the heavy and light components by rotating the liquid medium into a first vertical rotational pattern having a substantially flat, horizontal upper fluid level and a combination of vertical height and angular velocity sufficient to allow gravity to separate some of the heavy component from the light component by settling some of the heavy component out of the liquid medium, said angular velocity being so slow that centrifugal effects on separation of the heavy and light components are negligible and turbulence is not generated in the liquid medium sufficient to cause mixing of any heavy component settled out of the liquid medium with said light component, yet sufficiently fast to collect any heavy component settled out of the liquid medium at the bottom center of the rotational pattern, wherein said first settling basin has a bottom, a circular cross-section defined by a vertical sidewall of a vertical height sufficient to hold the liquid medium at said upper fluid level to allow gravity to separate some of the heavy component from the light component by settling the heavy component out of the liquid medium when in use, and an open top free of a cyclonic discharge member;
- at least one additional like settling basin having a bottom, a circular cross-section defined by a vertical sidewall of a vertical height sufficient to hold the liquid medium at said fluid level to allow gravity to separate some of the heavy component from the light component by settling the heavy component out of the liquid medium when in use, and a top free of a cyclonic discharge member, wherein said additional like settling basin is connected by a gate opening along the full vertical height of said sidewall of said additional like settling basin to said first settling basin, said gate opening allowing the liquid medium to flow from said additional like settling basin to said first settling basin;
- a liquid medium inlet tangentially disposed along the full vertical height of said sidewall of at least one of said first settling basin and said at least one additional like settling for causing injection of the liquid medium into at least one of said first settling basin and said at least one additional like settling basin to form said first vertical rotational pattern;
- a light component outlet disposed at and discharging from the top of said fluid level of the liquid medium in at least one of said first and additional like settling basins; and
- at least one heavy component outlet disposed at and discharging from the center of the bottom of each of said first and additional like settling basins.

6. The apparatus of claim 5, wherein said first and additional like settling basins are parallel arranged in a rectangular array.

7. The apparatus of claim 5, wherein said liquid medium inlet is disposed between two of said first and additional like settling basins connected by said gate.

8. The apparatus of claim 5, wherein said gate opening is further comprised of a flow barrier plate.

9. The apparatus of claim 5, wherein said first and additional like settling basins are arranged in a sequential array comprised of first and last settling basins, and wherein said light component outlet is disposed at and discharges from said last settling basin in said sequential array.

10. The apparatus of claim 5, wherein said heavy component outlet discharges into a receptacle commonly provided below at least two of said first and additional like settling basins.

11. The apparatus of claim 5, wherein said first and additional like settling basins are arranged in a sequential array, and wherein said sequential array is in the form of a zig-zig pattern.

12. The apparatus of claim 5, wherein said light component outlet is in the form of an overflow discharge at an outer rim on the sidewall of at least one of said first and additional like settling basins.

13. The apparatus of claim 5, wherein said first and additional like settling basins are arranged in a sequential array and have bottoms vertically staggered from one another.

14. The apparatus of claim 5, wherein each of said first and additional like settling basins has a diameter greater than the length of the vertical sidewall height of the basin.

* * * * *

UNITED STATES PATENT AND TRADEMARK OFFICE
CERTIFICATE OF CORRECTION

PATENT NO. : 4,976,875
DATED : December 11, 1990
INVENTOR(S) : Seppo I. Ryynänen It is certified that error appears in the above-identified patent and that said Letters Patent is hereby corrected as shown below:

On the title page:

In the identification line [75] after, Inventor: Seppo I.Ryynänen, "Kuopio" should read --Kouvola--.

Column 1, line 51, "teacup" should read --tea-cup--.

Column 3, line 56, "votexes" should read -- vortexes--.

Signed and Sealed this

Eighth Day of December, 1992

Attest:

DOUGLAS B. COMER

Attesting Officer        Acting Commissioner of Patents and Trademarks